(12) United States Patent
Hilbig et al.

(10) Patent No.: US 9,199,847 B2
(45) Date of Patent: Dec. 1, 2015

(54) METHOD AND ARRANGEMENT FOR GENERATING OXYGEN

(75) Inventors: Rainer Hilbig, Aachen (DE); Achim Gerhard Rolf Koerber, Eindhoven (NL); Mareike Klee, Straelen (DE); Wilco Cornelis Keur, Weert (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/002,213

(22) PCT Filed: Feb. 27, 2012

(86) PCT No.: PCT/IB2012/050879
§ 371 (c)(1),
(2), (4) Date: Aug. 29, 2013

(87) PCT Pub. No.: WO2012/117325
PCT Pub. Date: Sep. 7, 2012

(65) Prior Publication Data
US 2013/0333563 A1    Dec. 19, 2013

(30) Foreign Application Priority Data
Mar. 3, 2011   (EP) ..................................... 11156858

(51) Int. Cl.
*B01D 53/22* (2006.01)
*C01B 13/02* (2006.01)
(Continued)

(52) U.S. Cl.
CPC ............ *C01B 13/0251* (2013.01); *B01D 53/22* (2013.01); *B01D 71/024* (2013.01);
(Continued)

(58) Field of Classification Search
CPC .... B01D 53/228; B01D 53/22; B01D 71/024; B01D 53/047; B01D 53/229; B01D 2256/12; B01D 2259/402; B01D 2325/027; C01B 13/0251; C01B 2210/0046; C01B 13/0255; C01B 13/0259; C01B 13/027
USPC .......................................................... 95/148
See application file for complete search history.

(56) References Cited

U.S. PATENT DOCUMENTS 4,783,203 A    11/1988  Doshi
5,360,467 A *  11/1994  Ketkar et al. ..................... 95/25
(Continued)

FOREIGN PATENT DOCUMENTS

CN    1042312 A    5/1990
CN    1128979 A    8/1996
(Continued)

OTHER PUBLICATIONS

P.V. Mercea et al, "Oxygen Separation from Air by a Combined Pressure Swing Adsorption and Continuous Membrane Column Process", Journal of Membrane Science 88, Mar. 16, 1994, Nos. 2/3, pp. 131-144.

*Primary Examiner* — Jason M Greene
*Assistant Examiner* — Anthony Shumate
(74) *Attorney, Agent, or Firm* — Michael W. Haas

(57) ABSTRACT

The invention relates to a method of generating oxygen. The method comprises the steps of: intermittently guiding a stream of oxygen comprising gas through at least one adsorption chamber (12) being equipped with an oxygen separation adsorbent (16), thereby defining an adsorption mode and a desorption mode of the at least one adsorption chamber (12), and thereby enriching the oxygen comprising gas with respect to oxygen, guiding the enriched oxygen comprising gas to a primary side of a dense membrane (52), heating the dense membrane (52) to a temperature at which it is permeable for oxygen, generating an oxygen flow through the dense membrane (52) to its secondary side, thereby separating the oxygen from the enriched oxygen comprising gas and forming a stream of oxygen. According to the invention, the invention further comprises the step of guiding at least a part of the generated oxygen through the at least one adsorption chamber (12) being in desorption mode. The method according to the invention allows generating oxygen in a high purity, thereby being energy saving, cost saving and being performable in a compact device.

11 Claims, 1 Drawing Sheet

(51) Int. Cl.
   *B01D 71/02* (2006.01)
   *B01D 53/047* (2006.01)

(52) U.S. Cl.
   CPC ........... *C01B13/027* (2013.01); *C01B 13/0255* (2013.01); *C01B 13/0259* (2013.01); *B01D 53/047* (2013.01); *B01D 53/229* (2013.01); *B01D 2256/12* (2013.01); *B01D 2259/402* (2013.01); *B01D 2325/027* (2013.01)

(56) References Cited

U.S. PATENT DOCUMENTS

| | | | |
|---|---|---|---|
| 5,607,572 A * | 3/1997 | Joshi | 205/763 |
| 6,652,627 B1 * | 11/2003 | Tonkovich et al. | 95/104 |
| 7,025,803 B2 * | 4/2006 | Wascheck et al. | 95/50 |
| 7,273,051 B2 * | 9/2007 | Whitley et al. | 128/205.11 |
| 7,303,606 B2 * | 12/2007 | Zeng et al. | 95/114 |
| 7,350,521 B2 * | 4/2008 | Whitley et al. | 128/205.11 |
| 7,399,342 B2 * | 7/2008 | Bizjak | 95/98 |
| 7,722,701 B2 * | 5/2010 | Nehez | 95/45 |
| 8,012,446 B1 * | 9/2011 | Wright et al. | 423/437.1 |
| 8,038,771 B2 * | 10/2011 | Bizjak | 95/98 |
| 8,133,302 B2 * | 3/2012 | Northrop et al. | 95/55 |
| 8,221,524 B2 * | 7/2012 | Mitariten | 95/54 |
| 8,313,560 B1 * | 11/2012 | Cote et al. | 95/90 |
| 8,357,229 B2 * | 1/2013 | Lambert | 95/138 |
| 8,460,434 B2 * | 6/2013 | Turner et al. | 95/117 |
| 8,500,850 B2 * | 8/2013 | Carati et al. | 95/103 |
| 8,549,857 B2 * | 10/2013 | Papile | 60/641.2 |
| 8,557,029 B2 * | 10/2013 | Force et al. | 95/148 |
| 8,591,627 B2 * | 11/2013 | Jain | 95/52 |
| 2002/0192135 A1 | 12/2002 | Shreiber | |
| 2005/0223895 A1 * | 10/2005 | Wong | 95/148 |
| 2009/0288557 A1 * | 11/2009 | Carati et al. | 95/103 |
| 2010/0116132 A1 | 5/2010 | Staiger et al. | |
| 2010/0292524 A1 * | 11/2010 | Turner et al. | 585/802 |
| 2012/0145000 A1 * | 6/2012 | Chaubey et al. | 95/148 |
| 2014/0048409 A1 * | 2/2014 | Hilbig et al. | 204/156 |
| 2015/0128800 A1 * | 5/2015 | Bliss et al. | 95/90 |
| 2015/0128801 A1 * | 5/2015 | Hilbig et al. | 95/148 |

FOREIGN PATENT DOCUMENTS

| | | |
|---|---|---|
| CN | 101092297 A | 12/2007 |
| DE | 4221593 A1 | 1/1993 |
| EP | 0858826 | 8/1998 |
| EP | 2196235 | 6/2010 |
| WO | WO2007148057 A1 | 12/2007 |

* cited by examiner

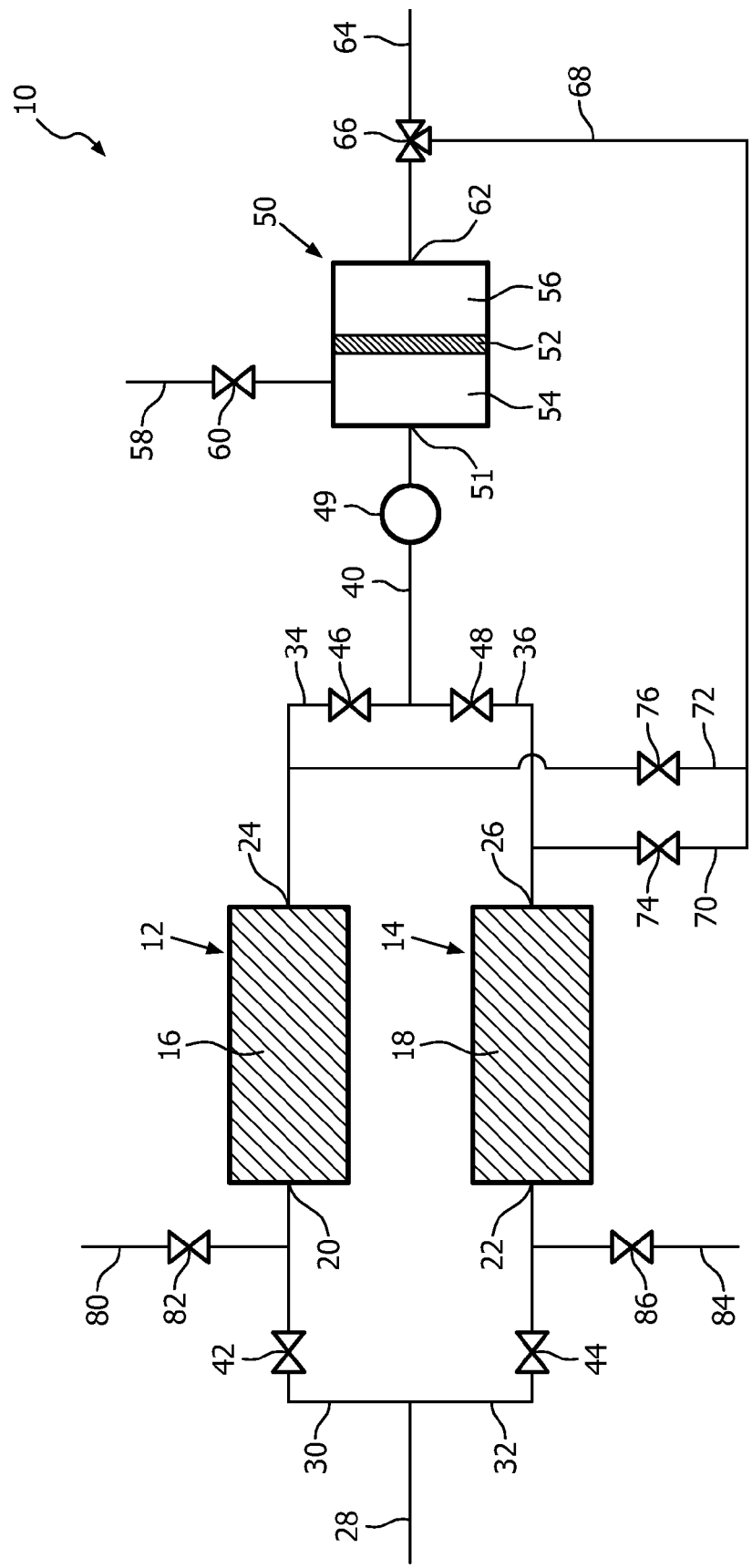

METHOD AND ARRANGEMENT FOR GENERATING OXYGEN

CROSS-REFERENCE TO PRIOR APPLICATIONS

This application is the U.S. National Phase application under 35 U.S.C. §371 of International Application Serial No. PCT/IB2012/050879, filed on Feb. 27, 2012, which claims the benefit of European Application Serial No. 11156858.0, filed on Mar. 3, 2011. These applications are hereby incorporated by reference herein.

FIELD OF THE INVENTION

The invention relates to the field of oxygen generation. The invention particularly relates to the field of oxygen separation using pressure swing adsorption combined with a dense inorganic membrane.

BACKGROUND OF THE INVENTION

Oxygen therapy is the administration of oxygen as a therapeutic modality. It is widely used for a variety of purposes in both chronic and acute patient care as it is essential for cell metabolism, and in turn, tissue oxygenation is essential for all physiological functions. Oxygen therapy can be used to benefit the patient by increasing the supply of oxygen to the lungs and thereby increasing the availability of oxygen to the body tissues, especially when the patient is suffering from hypoxia and/or hypoxaemia. Oxygen therapy may be used both in applications in hospital or in home care. The main home care application of oxygen therapy is for patients having severe chronic obstructive pulmonary disease (COPD).

Oxygen may be administered in a number of ways. A preferable way of oxygen administration is given by a so called on demand generation of oxygen, or an in situ generation, respectively. Referring to this, commercial solutions, so-called oxygen concentrators, or separators, respectively, are widely known. These oxygen concentrators mostly separate oxygen from an oxygen comprising gas, so that the oxygen is provided on demand, i.e. directly before use. Most known oxygen concentrators require a compressor to compress the oxygen containing gas. Furthermore, oxygen, preferably pure oxygen, has to be generated. Therefore, most known oxygen concentrators comprise a membrane, in particular an organic membrane, a molecular sieve, or the like, to separate oxygen from the oxygen comprising gas. Alternatively, using a pressure swing adsorption, or vacuum swing adsorption is known.

One of the major drawbacks of the known oxygen concentrators is given by the costs which are generated with respect to producing and operating said devices. Additionally, by using swing processes such as pressure swing adsorption, the generated oxygen typically has a concentration of more than 88% but mostly below 95%, in particular of more than 90% but below 93%. These concentrations, however, might be too low for a plurality of applications.

Known from EP 2 196 235 A1 is a ceramic oxygen generating system for generating and delivering oxygen to a user. This system comprises an electrochemical oxygen generating means for producing a controlled amount and pressure of a desired product gas and an electronically controlled unit controlling the operation of the electrochemical oxygen generating system. The product gas from the gas generating system is thereby communicated to a regulator means for controlling the product flow to a user of the product gas. In order to generate oxygen, the system may comprise a low pressure subsystem which uses ceramic oxygen generating elements for purifying impure oxygen supplied by other oxygen generating techniques, such as pressure swing adsorption.

Using such a system for generating oxygen from an oxygen comprising gas, oxygen of a high purity may be provided. However, by using two oxygen separation devices, the maintenance costs by using the system may be rather high.

SUMMARY OF THE INVENTION

It is an object of the present invention to provide a method and an arrangement for generating oxygen which overcomes at least one of the limitations as set forth above.

It is a further object of the invention to provide a method and an arrangement for generating oxygen which may provide oxygen with high purity and low maintenance costs.

These objects are achieved by a method of generating oxygen, said method comprising the steps of: intermittently guiding a stream of oxygen comprising gas through at least one adsorption chamber being equipped with an oxygen separation adsorbent, thereby defining an adsorption mode and a desorption mode of the at least one adsorption chamber, and thereby enriching the oxygen comprising gas with respect to oxygen, guiding the enriched oxygen comprising gas to a primary side of a dense membrane, heating the dense membrane to a temperature at which it is permeable for oxygen, generating an oxygen flow through the dense membrane to its secondary side, thereby separating the oxygen from the enriched oxygen comprising gas and forming a stream of oxygen, wherein said method further comprises the step of guiding at least a part of the generated oxygen through the at least one adsorption chamber being in desorption mode.

According to the invention, oxygen is generated by using a method essentially comprising two main steps. The first step comprises an enrichment with respect to oxygen of the oxygen comprising gas resulting in a stream of enriched oxygen comprising gas. This step is carried out by adsorbing the remaining components, or at least a part of the remaining components, of the oxygen comprising gas by an oxygen separation adsorbent. An oxygen separation adsorbent according to the invention is thus an adsorbent letting oxygen pass but interacting with other components, or at least with one other component of the oxygen comprising gas. For example, if the oxygen comprising gas is air, the adsorbent preferably adsorbs nitrogen. The oxygen separation adsorbent is thereby arranged in an adsorbent chamber. This first step provides a flow of gas being enriched with respect to oxygen and thus being pre-purified.

In the second step, the enriched oxygen comprising gas is guided to a membrane unit having a dense membrane, in detail to the primary side of the membrane. This enables to generate a stream of the enriched oxygen comprising gas through the dense membrane, or of the oxygen of the latter, thereby separating the oxygen from the remaining components of enriched the oxygen comprising gas. Especially by using a dense ceramic membrane, the enriched oxygen comprising gas is further purified and thus a flow of pure or essentially pure oxygen is generated as permeate, at the secondary side of the dense membrane. Accordingly, a gas being depleted with respect to oxygen is generated as retentate flow at the primary side of the dense membrane. Referring to this, the primary side of the dense membrane is the side being directed towards the adsorption chamber, i.e. to the side from where the enriched oxygen comprising gas is guided to the membrane. Consequently, the secondary side of the dense membrane is the side being opposite to the primary side, i.e. at the secondary side, pure oxygen is provided.

Furthermore, due to the fact that the oxygen comprising gas is guided through the adsorption chamber intermittently, an adsorption mode and a desorption mode of the at least one adsorption chamber is defined. In detail, in case the oxygen comprising gas is guided through the adsorption chamber, the latter is in adsorption mode, thus adsorbing at least a part of remaining constituents of the oxygen comprising gas. After a certain interval of adsorption, i.e. in which interval the adsorbent chamber is in adsorption mode, the adsorbent has to be regenerated. This means that the adsorbed components have to be desorbed again, for example by flushing the adsorbent with oxygen. During this period of time, the adsorption chamber is in desorption mode, which means that the adsorbed species, for example nitrogen, are at least partially released and flushed out of the chamber by suited measures.

According to the invention, the adsorbent is regenerated in its desorption mode by using at least a part of the permeate stream of the membrane unit, i.e. the generated pure oxygen. Therefore, at least a part of the generated oxygen is guided through the at least one adsorption chamber when the latter is in desorption mode.

These measures according to the invention lead to several benefits. For example, by combining an enrichment of an oxygen comprising gas with respect to oxygen together with the usage of a dense membrane, oxygen may be generated in a very high purity. However due to the fact that the oxygen is pre purified by the oxygen separation adsorbent leading to a high oxygen concentration before reaching the dense membrane, the separation performance of the dense membrane may be improved compared to a single membrane system. In detail, the heating power required for heating the dense membrane in order to make it permeable for oxygen may be considerably reduced. This is especially preferred for home-care devices with respect to therapeutic applications due to the fact that bulky and heavy batteries may be saved. Additionally, the costs of performing the method according to the invention may be reduced increasing the economy of a method according to the present invention.

For example, by using a standard adsorption system as used in nowadays oxygen concentrators for medical applications, approximately 300 W input power may be used to come up with an oxygen flux of 5 l/min. A main reason for the power consumption is the power consumption of the compressor generating an appropriate gas stream. In a combined adsorption and separating method according to the invention an input power of approximately 130 W may be sufficient for the adsorption chamber. Together with the power input for heating the dense membrane, an overall power input of approximately 240 W may be sufficient.

Additionally, due to the fact that at least a part of the generated oxygen is guided through the at least one adsorption chamber being in desorption mode, oxygen is not guided solely to its desired application, but at least a part of the oxygen stream may be branched off in order to regenerate the adsorbent. This allows optimizing the desorption step. In detail, the desorption step is strongly dependent from the purity of the purging gas. According to the invention, this requirement is solved by the synergistic effect of combining both purifying steps. At the secondary side of the dense membrane, a stream of oxygen is generated having a very high purity, i.e. up to 100%. Therefore, the so generated gas is very well suited for being used as purging gas in order to purge the adsorption chamber to desorb the components being adsorbed to the oxygen separation adsorbent. Thus, according to the invention a very effective desorption may be realized, thereby allowing very short desorption times. This further improves the efficiency of the method according to the invention. Additionally, due to the fact that the generated gas is used for purging purposes, no further gas source has to be provided. Consequently, the method according to the invention may be performed in a very compact device which is particularly suitable for home care applications allowing a high degree of convenience, or for further applications in which only a limited space is available.

Besides, due to the fact that the purging gas is generated at the hot dense membrane, the purging gas as such exhibits elevated temperatures when streaming into the adsorption chamber. This additionally improves the desorption step due to the fact that a desorption is thermodynamically improved by using a hot purging gas. This effect further reduces the time required for a desorption and furthermore improves the efficiency of the desorption.

According to a preferred embodiment of the present invention the stream of oxygen comprises oxygen in a concentration in a range of ≥95%. Consequently, a membrane unit, or a membrane, respectively, is used allowing providing a stream of oxygen in a very high purity, i.e. up to 100%. This further improves the effects of purging the adsorbent chambers with the oxygen stream coming from the membrane chamber.

According to a further preferred embodiment of the present invention the stream of oxygen comprising gas is guided alternately through at least two adsorption chambers being connected in parallel. Again, the generated oxygen is at least partly guided through the respective adsorption chamber when being in desorption mode. This allows generating a continuous, or at least particularly continuous flow of gas being enriched with oxygen at the outlet of the desorption chambers. In detail, a first desorption chamber may be in adsorption mode, i.e. the oxygen comprising gas is guided through this adsorption chamber thereby enriching the oxygen comprising gas with respect to oxygen, whereas the a second adsorption chamber is in desorption mode, i.e. the adsorbent of the latter is regenerated. Accordingly, there is always at least one adsorbent chamber being in adsorption mode, at which time at least one further adsorption chamber is in desorption mode resulting in a continuous stream of enriched oxygen comprising gas. It is clear for one skilled in the art that this embodiment may be performed either with two or more that two adsorption chambers. It may then be adjusted according to the used adsorbent and according to the desired application how many adsorption chambers may be in adsorption mode, or desorption mode, respectively.

According to a further preferred embodiment of the present invention the oxygen is guided through the at least one adsorption chamber being in desorption mode in a direction being reversed with respect to the direction of the stream of oxygen comprising gas. This allows purging the respective adsorption chamber from its outlet side. According to this, the desorption process starts at the downstream end of the adsorption chamber. Therefore, the hot purging gas firstly comes in contact with the downstream end of the adsorption chamber and cools down during flowing through the adsorption chamber. Consequently, the gas is cooler at the upstream end of the adsorption chamber with respect to the flow direction of the oxygen comprising gas resulting in a temperature gradient of the adsorbent from its downstream end to its upstream end at the end of the desorption process. The following adsorption step may thus start using at an adsorbent having only slightly elevated temperatures thus not considerably decreasing the adsorption capability of the adsorbent. Additionally, during the adsorption process, an adsorption front is propagating through the adsorption chamber during which the adsorbent is cooled by means of the oxygen comprising gas. Therefore, when the adsorption front reaches a certain region, the latter does not exhibit elevated temperatures anymore. Consequently, the desorption step may be improved by use of the hot purging gas, whereas the adsorption step is not considerably deteriorated.

According to a further preferred embodiment of the present invention the oxygen comprising gas is guided to the at least one adsorption chamber by use of an overpressure. This method is thus a so called pressure swing adsorption (PSA) process. Pressure swing adsorption processes may enrich the oxygen comprising gas with respect to oxygen in an adaptable concentration. Additionally, pressure swing adsorption is an economic method especially for small scale generation of oxygen having a reasonable purity being suitable for pre-purifying the oxygen comprising gas before the latter reaches the membrane unit.

With this regard, it is especially preferred that an overpressure of $\geq 0.2$ bar to $\leq 2$ bar is used. By using an overpressure in the above identified range, the pressure is sufficient for guiding the oxygen comprising gas through the adsorbent chamber, or the adsorbent chambers, respectively, and furthermore for creating a stream of oxygen enriched gas which may permeate through the dense membrane, or only the oxygen of the latter, respectively. Accordingly, only one pressurizing device may be sufficient for enabling a stream of oxygen comprising gas resulting in a sufficient stream of pure oxygen.

In a further preferred embodiment of the present invention, the oxygen comprising gas is enriched with respect to oxygen in the adsorption chamber to an oxygen concentration in the range of $\leq 88\%$. Consequently, the purification of the first step is not required to be in such a high degree being typical for swing adsorption steps, but the purification performance, or enrichment performance, respectively may be downscaled. This allows further reducing the power consumption of the adsorption step such as a lower compressor power. Apart from that, the ratio of the adsorption step with respect to the desorption step may be improved such that adsorption may be performed during a longer time scale before a desorption has to be performed. Additionally, the adsorbent chamber may be downscaled with respect to its dimension by using smaller adsorbent surfaces or smaller adsorption beds. Furthermore, particularly according to this embodiment two adsorption chambers may be sufficient. Consequently, the device for performing the method according to the invention may be very compact. The above defined advantages with respect to lower power consumption and smaller dimensions are especially preferred at home care devices for example in the field of therapeutic applications. The reduced purifying quantity is however not problematic due to the fact that the enriched oxygen comprising gas is purified further by means of the second step, i.e. by the dense membrane.

The present invention further relates to an arrangement for generating oxygen, the arrangement comprising at least one adsorption chamber being equipped with an oxygen separation adsorbent and having an inlet for inserting oxygen comprising gas into the adsorption chamber and an outlet for guiding enriched oxygen comprising gas out of the adsorption chamber, wherein the arrangement further comprises a membrane unit comprising a dense membrane and having an inlet at a primary side of the membrane for inserting enriched oxygen comprising gas into the membrane unit, and an outlet at a secondary side of the membrane for guiding oxygen out of the membrane unit, wherein the outlet of the at least one adsorption chamber is in fluid communication with the inlet of the membrane unit, and wherein a conduit is provided connecting the outlet of the membrane unit with the outlet of the at least one adsorption chamber.

The arrangement according to the invention is configured for performing the method according to the invention. Consequently, essentially the advantages being described with respect to the method according to the invention are achieved. In detail, the arrangement according to the invention allows generating oxygen in a very high purity, thereby being energy saving and thus cost saving. Consequently, the arrangement according to the invention allows enriching an oxygen comprising gas with respect to oxygen in a first step and to separate the oxygen from the enriched oxygen comprising gas in a second step, thereby using the permeate stream of the membrane unit to flush the adsorption chamber, like described above with respect to the method according to the invention.

According to the invention, at least one adsorption chamber is provided. The adsorption chamber is equipped with an oxygen separation adsorbent. According to the invention, an oxygen separation adsorbent shall mean an adsorbent which is capable of at least partly separating oxygen from an oxygen comprising gas. Consequently, the oxygen separation adsorbent is capable of adsorbing substances which are present in the oxygen comprising gas and to let the oxygen pass in order to separate the oxygen from at least a part of the remaining components. In case air is used as oxygen comprising gas, for example, it is preferred that the oxygen separation adsorbent adsorbs nitrogen.

Furthermore, the arrangement according to the invention comprises a dense membrane in order to separate oxygen form the enriched oxygen comprising gas. A dense membrane particularly is a membrane being selectively permeable with respect to oxygen, but being strictly or at least substantially non-permeable for other gases, especially for nitrogen.

Due to the fact that a conduit is provided connecting the outlet of the membrane unit with the outlet of the at least one adsorption chamber, the adsorption chamber may be purged with pure and hot oxygen. A conduit may thereby comprise several single conduits being connected to each other. The conduit thereby particularly extends outside the membrane unit, i.e. the gas is not guided through the membrane in order to guide the oxygen, or at least a part of it, through an adsorption chamber when oxygen comprising gas is guided through the membrane. A conduit may thereby be any device or connection which is capable of transporting a gas stream. For example, the conduit may be a duct, a tube, a pipe, or the like.

In a preferred embodiment of the present invention, the arrangement comprises at least two adsorption chambers being connected in parallel. Of course, there may be more than two adsorption chambers depending on the desired application and depending on the desired stream of oxygen, for example of the amount of oxygen stream required. By providing at least to adsorption chambers, a continuous stream of oxygen comprising gas being enriched with respect to oxygen may be generated at the outlet of the adsorption chambers. By connecting the at least two adsorption chambers in parallel, at least one adsorption chamber may be used in adsorption mode, whereas at least one adsorption chamber may be used in desorption mode. Consequently, a pressure swing adsorption may be performed in the arrangement according to this embodiment. It is clear to one skilled in the art that by providing more than one adsorption chamber, the outlet of the membrane unit is in fluid communication with the outlets of all adsorption chambers due to the fact that all adsorption chambers have to be purged for desorption purposes.

In a further preferred embodiment of the present invention, the oxygen separation adsorbent comprises a zeolite material. These materials exhibit good adsorption properties with respect to nitrogen, for example, allowing getting suitable results of an enrichment of the oxygen comprising gas with respect to oxygen. Additionally, these materials do not interact with oxygen thus not releasing toxic substances in the stream of oxygen comprising gas. Consequently, the arrangement according to the invention may be used in therapeutic applications.

In a further preferred embodiment of the present invention, the membrane is based on a material having a perovskite or fluorite crystal structure. It is especially preferred, that the membrane is based on a perovskite, the perovskite being chosen from the group comprising $Sr_{1-y}Ba_yCo_{1-x}FexO_{3-z}$, which can be undoped or doped with donors or acceptors and $La_{1-y}Sr_yFe_{1-x}Cr_xO_{3-z}$, which can be undoped or doped with niobium, magnesium, titanium or gallium, $Sr_{1-y-x}Ba_yLa_x Co_{1-b-c}Fe_bCr_cO_{3-z}$, which can be undoped or doped with e.g. donors or acceptors like niobium, magnesium, titanium or gallium, $Ba_{1-x}Sr_xTiO_{3-z}$, which can be undoped or doped with donors or acceptors such as manganese, iron, chromium or any other doping compounds and $PbZr_{1-x}Ti_xO_{3-z}$, which can be undoped or doped with donors or acceptors such as iron, niobium, lanthanum, chromium, or any other doping compounds. These kind of ceramic compounds exhibit a good flux of gas and furthermore have an excellent selectivity with respect to oxygen. In detail, if the primary side of the membrane comprising this component may be subjected to an overpressure of air, for example, it will let oxygen pass only. Thereby, it is possible to generate oxygen in a purity of up to 100%.

In a further preferred embodiment of the present invention a gas reservoir is provided between the outlet of the at least one adsorption chamber and the inlet of the membrane unit. This embodiment allows storing the enriched oxygen comprising gas before guiding it to the membrane unit. Consequently, it is possible to guide the oxygen enriched gas to the membrane unit with a pressure which is higher compared to the pressure the oxygen comprising gas is guided through the adsorption chamber. Therefore, a further pressurizing device may be provided between the adsorption chamber and the membrane unit. This embodiment further allows providing a continuous flow of pure oxygen in any case at the outlet of the membrane unit. For example, in case only one adsorption chamber is used, the desorption step of this adsorption chamber may be bridged. Additionally, even in case the step of changing the gas flow between two adsorption chambers is accompanied with a gap in the air stream a continuous stream may be provided at the dense membrane in case two or more adsorption chambers are used.

In a still further embodiment of the present invention, a gas reservoir is provided downstream the outlet of the membrane unit and upstream the at least one adsorption chamber. This allows storing purified oxygen and guiding the latter to the desired application when it is required. In therapeutic applications, for example, it may be preferred to provide an intermittent stream of pure oxygen. During these times, the full stream of oxygen being generated at the membrane unit may be guided to the required application. During the time of a gap however, the stream of oxygen may be guided into the reservoir thereby filling the latter. Consequently, a full stream of oxygen may be provided both for purging and for application purposes. Alternatively, the oxygen may be guided directly into the gas reservoir and further on to desired application as well as to the at least one adsorption chamber. Therefore, the gas reservoir may comprise two outlets. It is thus ensured that at each time of the method according to the invention a sufficient stream of oxygen may be guided both to the application and to the adsorption chamber.

BRIEF DESCRIPTION OF THE DRAWINGS

These and other aspects of the invention will be apparent from and elucidated with reference to the embodiments described hereinafter.

In the drawings:

FIG. 1 shows a schematic cross sectional view of an arrangement according to the invention.

DETAILED DESCRIPTION OF EMBODIMENTS

In FIG. 1, an arrangement 10 for generating oxygen is schematically shown. The arrangement 10 may be used for generating oxygen with respect to therapeutic applications, for example in the field of COPD treatment. The arrangement 10 may be designed as a stationary arrangement, for example for using it in a hospital, or it may be a portable device, for example for using it in the field of homecare applications. However, the arrangement 10 may furthermore be used for any application at which pure or essentially pure oxygen has to be provided, for example in air planes or for welding purposes.

The arrangement 10 comprises at least one adsorption chamber 12. However, it is preferred that the arrangement 10 comprises at least two adsorption chambers 12, 14, the adsorption chambers 12, 14 being connected in parallel. In the following, the invention is described with respect to two adsorption chambers 12, 14. However, it is clear for one skilled in the art that every feature may be provided correspondingly by using just one adsorption chamber 12 or more than two adsorption chambers 12, 14. Each adsorption chamber 12, 14 is equipped with an oxygen separation adsorbent 16, 18. The oxygen separation adsorbent 16, 18 is configured for letting oxygen pass but for interacting with, or adsorbing, respectively other components being present in an oxygen comprising gas. In case air is used as oxygen comprising gas, it is thus preferred that the oxygen separation adsorbent 16, 18 is configured for adsorbing nitrogen. Suitable oxygen separation adsorbents 16, 18 may comprises a zeolite material. However it may be possible to use every suitable oxygen separation adsorbent known in the art for swing processes, such as pressure swing adsorption ore vacuum swing adsorption.

Each adsorbent chamber 12, 14 has an inlet 20, 22 for inserting oxygen comprising gas into the adsorption chamber 12, 14 and an outlet 24, 26 for guiding enriched oxygen comprising gas out of the adsorption chamber 12, 14. Therefore, the inlets 20, 22 of the adsorption chambers 12, 14 are connected to an inlet 28 of the arrangement 10. Connected to the inlet 28 may be a source of oxygen comprising gas, such as a gas storing device. However, there may simply be a pump which guides the surrounding air into the inlet 28. Starting from the inlet 28, a conduit 30 is connected to the inlet 28 as well as to the inlet 20 of the first adsorption chamber 12, whereas a conduit 32 is connected to the inlet 28 and the inlet 22 of the second adsorption chamber 14. Furthermore, the outlet 24 of the first adsorption chamber 12 is connected to a conduit 34 which in turn is connected to an outlet conduit 40, whereas the outlet 26 of the second adsorption chamber 14 is connected to a conduit 36 which in turn is connected to the outlet conduit 40. Consequently, the adsorption chambers 12, 14 are connected in parallel. It is apparent to one skilled in the art that a respective arrangement may be formed by using more than two adsorption chambers 12, 14.

In order to allow the oxygen comprising gas to be guided through the adsorption chambers 12, 14 intermittently, a valve 42 may be provided in the conduit 30 and a further valve 44 may be provided in the conduit 32. A valve according to the invention shall be any device which may allow a gas flow, inhibit a gas flow and/or regulate the amount of a gas flow. Consequently, by closing the valve 42 and by opening the valve 44, the oxygen comprising gas may be guided through the second adsorption chamber 14, whereas the oxygen comprising gas may be guided through the first adsorption chamber 12 by opening the valve 42 and by closing the valve 44. Correspondingly, a valve 46 may be provided in the conduit 34 and a valve 48 may be provided in the conduit 36. By guiding the oxygen comprising gas through the first adsorption chamber 12, the valve 46 should be opened whereas the valve 48 should be closed. Correspondingly, by guiding the oxygen comprising gas through the second adsorption chamber 14, the valve 48 should be opened whereas the valve 46 should be closed. This ensures that the enriched oxygen comprising gas is guided solely into the outlet conduit 40.

The arrangement 10 thus allows intermittently guiding a stream of oxygen comprising gas through at least one adsorption chamber 12, or through more than one adsorption chamber, for example two adsorption chambers 12, 14 being equipped with an oxygen separation adsorbent 16, 18 thereby enriching the oxygen comprising gas with respect to oxygen. In that way, an adsorption mode and a desorption mode of the at least one adsorption chamber, or adsorption chambers 12, 14, respectively, is defined. Particularly, the stream of oxygen comprising gas is guided alternately through at least two adsorption chambers 12, 14 being connected in parallel. It may be preferred that the oxygen comprising gas is enriched with respect to oxygen in the adsorption chamber to an oxygen concentration in the range of ≤88%, particularly in the range of ≤75%, especially preferred in the range of ≤50%.

Downstream the outlet conduit 40, the arrangement 10 further comprises a membrane unit 50, wherein the outlets 24, 26 of the adsorption chambers 12, 14 are in fluid communication with an inlet 51 of the membrane unit 50. It may be preferred that a gas reservoir 49 is provided between the outlets 24, 26 of the adsorption chambers 12, 14 and the inlet 51 of the membrane unit 50. Especially by providing just one adsorption chamber 12, the gas reservoir 49 may allow generating a continuous gas stream. It is furthermore preferred that the oxygen comprising gas is guided to the at least one adsorption chamber 12 by use of an overpressure. This allows in one step guiding the enriched oxygen comprising gas into the membrane unit 50 and creating a stream of gas through the membrane unit 50 like it will be apparent down below. Therefore, an overpressure of ≥0.2 bar to ≤2 bar may be preferred.

The membrane unit 50 comprises a dense membrane 52 in order to separate oxygen from the remaining components of the enriched oxygen comprising gas coming from the adsorption chambers 12, 14 and thus being enriched with respect to oxygen. To achieve these properties, the membrane 52 may be a solid ceramic membrane comprising selected inorganic oxide compounds. Preferable membranes 52 are based on a perovskite or fluorite crystal structure. As an example, the perovskite may be chosen from the group comprising $Sr_{1-y}Ba_yCo_{1-x}Fe_xO_{3-z}$, which can be undoped or doped with donors or acceptors and $La_{1-y}Sr_yFe_{1-x}Cr_xO_{3-z}$, which can be undoped or doped with niobium, magnesium, titanium or gallium, $Sr_{1-y-x}Ba_yLa_xCo_{1-b-c}Fe_bCr_cO_{3-z}$, which can be undoped or doped with e.g. donors or acceptors like niobium, magnesium, titanium or gallium, $Ba_{1-x}Sr_xTiO_{3-z}$, which can be undoped or doped with donors or acceptors such as manganese, iron, chromium or any other doping compounds and $PbZr_{1-x}Ti_xO_{3-z}$, which can be undoped or doped with donors or acceptors such as iron, niobium, lanthanum, chromium, or any other doping compounds. As a preferred example, the perovskite-related material $Ba_{0.5}Sr_{0.5}Co_{0.5}Fe_{0.2}O_{3-\delta}$ (BSCF) is very well suited. As an alternative, for example, a $Sr_{0.5}Ba_{0.5}Co_{0.8}Fe_{0.2}O_{3-x}$ thin film may be used. Especially in case such membranes 52 are used, it may be required to heat the dense membrane 52 to a temperature at which it is permeable for oxygen. This may be realized in a direct way, for example by providing a heating device for heating the membrane 52, or in an indirect way, by heating the oxygen comprising gas and heat the membrane 52 by the influence of the hot gas. However, in the last case it is preferred to heat the oxygen comprising gas downstream the adsorption chamber 12, or the adsorption chambers 12, 14, respectively, due to the fact that a hot gas will deteriorate the adsorption step. Consequently, it may be preferred to combine a heating device with a gas reservoir 49 or with a further pump being arranged upstream the membrane unit 50.

The membrane 52 comprises a primary side, which may be visualized by a primary membrane chamber 54, and the membrane 52 further comprises a secondary side, which may be visualized by the secondary membrane chamber 56. The membrane 52 is dense which means that the oxygen is separated from the remaining components of the enriched oxygen comprising gas. In order to guide the enriched oxygen comprising gas into the membrane unit 50 and to the primary side of the membrane 52, the inlet 51 is arranged at the primary side of the membrane 52.

Consequently, on the primary side of the membrane 52, a stream of gas is generated which is depleted with respect to oxygen. This gas stream may leave the primary membrane chamber 54 through an outlet conduit 58. The outlet conduit 58 may thereby be equipped with a valve 60 to allow using a required pressure in the primary membrane chamber 54 as well as regulating the egress of the stream of gas out of the primary membrane chamber 54.

Correspondingly, due to the fact that a gas flow through the dense membrane 52 is generated to its secondary side thereby separating the oxygen from the enriched oxygen comprising gas, on the secondary side of the membrane 52, i.e. in the secondary membrane chamber 56, a stream of pure, or at least essentially pure oxygen is formed. The generated oxygen may leave the membrane unit 50 through an outlet 62 being arranged at the secondary side of the membrane 52 and through an outlet conduit 64 and may be delivered to the desired application. For example, the oxygen may be delivered to an administration device, such as a mask, or it may be stored in a gas storing device.

In the outlet conduit 64, a valve 66, such as a three way valve may be provided. This valve 66 allows not only to guide the oxygen to the desired application, but also into a further conduit 68 in any desired ratio. Furthermore, the membrane unit 50 may have two separate outlets at the secondary side of the membrane 52, one being connected to the outlet conduit 64 and one being connected to the conduit 68. Preferably, both outlets are equipped with respective valves allowing guiding a required stream of oxygen in each conduit 64, 68. Alternatively, a gas reservoir may be provided downstream the outlet 62 of the membrane unit 52. For example, the gas reservoir may be equipped with two outlets, one being connected to the outlet conduit 64 and one being connected to the conduit 68. Again, the gas reservoir allows not only guiding the oxygen to the desired application, but also into the conduit 68 in any desired ratio. The conduit 68 allows the outlet 62 of the membrane unit 50 being in fluid communication with the outlets 24, 26 of the adsorption chambers 12, 14, or with the outlet of one single adsorption chamber 12, respectively. Therefore, the conduit 68 comprises two branch conduits 70, 72 each having a valve 74, 76. The branch conduit 72 is connected to the conduit 34 downstream the outlet 24 of the adsorption chamber 12 but upstream the valve 46, whereas the branch conduit 70 is connected to the conduit 36 downstream the outlet 26 of the adsorption chamber 14 but upstream the valve 48, in the flow direction of the oxygen comprising gas. The conduit 68 may thus guide oxygen into the adsorption chambers 12, 14, respectively, being in desorption mode in a direction being reversed with respect to the direction of the stream of oxygen comprising gas.

In order to ensure that at least a part of the generated oxygen is guided through the respective adsorption chamber 12, 14, being in desorption mode in order to desorb the adsorbed substances, the valves 46, 48, 74, 76 may be regulated, dependent on which adsorption chamber 12, 14 is in desorption mode or in adsorption mode, respectively. For example, in case the adsorption chamber 12 is in adsorption mode, the oxygen is guided through the adsorption chamber 14 being in desorption mode. In this case, the valves 46, 74 are open, whereas the valves 48, 76 are closed. Correspondingly, in case the adsorption chamber 14 is in adsorption mode, the oxygen is guided through the adsorption chamber 12 being in desorption mode. In this case, the valves 48, 76 are open, whereas the valves 46, 74 are closed.

Downstream the adsorption chambers 12, 14, with respect to the above described flow direction of the oxygen as purging gas, an outlet conduit 80 being equipped with a valve 82 is connected to the conduit 30 and an outlet conduit 84 being equipped with a valve 86 is connected to the conduit 32. By opening or closing the respective valves 82, 84, the purging gas together with the desorbed substances, for example nitrogen, may be egressed out of the arrangement 10. In detail, in case the adsorption chamber 12 is in adsorption mode whereas the adsorption chamber 14 is in desorption mode, the valve 82 is closed and the valve 86 is opened. Correspondingly, in case the adsorption chamber 14 is in adsorption mode whereas the adsorption chamber 12 is in desorption mode, the valve 86 is closed and the valve 82 is opened.

Additionally, the purging step of the adsorption chamber 12 or the adsorption chambers 12, 14 may be performed by using both the stream of oxygen coming from the conduit 68 and thus from the membrane unit 50 and a stream of oxygen or oxygen comprising gas coming from a gas source being arranged outside the arrangement 10. In detail, a source of oxygen comprising gas may be used like known from the state of the art, for example, a gas cylinder of oxygen may be used. However, every purging gas can be used known for desorbing nitrogen, for example, from the oxygen separation adsorbent 16, 18. Consequently, a common purging gas may be guided into the adsorbent chambers 12, 14 together with the stream of oxygen either from the same side, i.e. through the outlets 24, 26, or from opposite sides, i.e. additionally through the inlets 20, 22. In the last case a further outlet may be preferred which is used for guiding the purging gases out of the adsorbent chambers 12, 14 for example in the middle part of the latter. This embodiment enables to increase the performance of a common purging step, thereby using a common purging gas as one source, for example as main source, and additionally a small part of the generated oxygen only.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. Method of generating oxygen, said method comprising the steps of:
   intermittently guiding a stream of oxygen comprising gas through at least one adsorption chamber being equipped with an oxygen separation adsorbent, thereby defining an adsorption mode and a desorption mode of the at least one adsorption chamber, and thereby enriching the oxygen comprising gas with respect to oxygen;
   guiding the enriched oxygen comprising gas to a primary side of a dense membrane;
   heating the dense membrane to a temperature at which it is permeable for oxygen; and
   generating an oxygen flow through the dense membrane to its secondary side, thereby separating the oxygen from the enriched oxygen comprising gas and forming a stream of oxygen, wherein the stream of oxygen comprises oxygen in a concentration in a range of ≥95%; and wherein said method further comprises the step of guiding at least a part of the generated stream of oxygen through the at least one adsorption chamber (12) being in desorption mode.

2. Method according to claim 1, wherein the stream of oxygen comprising gas is guided alternately through at least two adsorption chambers being connected in parallel.

3. Method according to claim 1, wherein the oxygen is guided through the at least one adsorption chamber being in desorption mode in a direction being reversed with respect to the direction of the stream of oxygen comprising gas.

4. Method according to claim 1, wherein the oxygen comprising gas is guided to the at least one adsorption chamber by use of an overpressure of ≥0.2 bar to ≤2 bar.

5. Method according to claim 1, wherein the oxygen comprising gas is enriched with respect to oxygen in the adsorption chamber to an oxygen concentration in the range of ≤88%.

6. Arrangement for generating oxygen, the arrangement comprising
   at least one adsorption chamber being equipped with an oxygen separation adsorbent and having an inlet for inserting oxygen comprising gas into the adsorption chamber and an outlet for guiding enriched oxygen comprising gas out of the adsorption chamber, wherein the arrangement further comprises
   a membrane unit comprising a dense membrane and having an inlet at a primary side of the membrane for inserting enriched oxygen comprising gas into the membrane unit, and an outlet at a secondary side of the membrane for guiding oxygen out of the membrane unit, wherein the oxygen guided out of the membrane unit comprises oxygen in a concentration in a range of ≥95%; and wherein the outlet of the at least one adsorption chamber is in fluid communication with the inlet of the membrane unit, and wherein a conduit is provided connecting the outlet of the membrane unit with the outlet of the at least one adsorption chamber.

7. Arrangement according to claim 6, wherein the arrangement (10) comprises at least two adsorption chambers being connected in parallel.

8. Arrangement according to claim 6, wherein the oxygen separation adsorbent comprises a zeolite material.

9. Arrangement according to claim 6, wherein the membrane comprises a material having a perovskite structure and/or a material having fluorite crystal structure.

10. Arrangement according to claim 6, wherein a gas reservoir (49) is provided between the outlet of the at least one adsorption chamber and the inlet (51) of the membrane unit.

11. Arrangement according to claim 6, wherein a gas reservoir is provided downstream the outlet of the membrane unit and upstream the at least one adsorption chamber.

* * * * *